United States Patent
Stephenne et al.

(10) Patent No.: US 10,028,296 B2
(45) Date of Patent: Jul. 17, 2018

(54) CLASSIFICATION OF REPORTING ENTITIES FOR COMMUNICATION RESOURCE MANAGEMENT

(71) Applicant: Telefonaktiebolaget LM Ericsson (publ), Stockholm (SE)

(72) Inventors: Alex Stephenne, Stittsville (CA); Leonard Lightstone, Ottawa (CA); DongSheng Yu, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 212 days.

(21) Appl. No.: 14/758,733

(22) PCT Filed: Jun. 8, 2015

(86) PCT No.: PCT/IB2015/054330
§ 371 (c)(1),
(2) Date: Jun. 30, 2015

(87) PCT Pub. No.: WO2016/198912
PCT Pub. Date: Dec. 15, 2016

(65) Prior Publication Data
US 2017/0150516 A1  May 25, 2017

(51) Int. Cl.
*H04W 68/00* (2009.01)
*H04W 36/00* (2009.01)
(Continued)

(52) U.S. Cl.
CPC ....... *H04W 72/1257* (2013.01); *H04W 24/10* (2013.01); *H04W 72/1231* (2013.01)

(58) Field of Classification Search
CPC ... H04W 36/0066; H04W 8/065; H04W 4/10; H04W 8/08
(Continued)

(56) References Cited

U.S. PATENT DOCUMENTS 7,421,585 B2 * 9/2008 Aoki ................. G06Q 30/0281
713/151
7,974,228 B2 * 7/2011 Bosch ..................... H04W 8/08
370/315
(Continued)

FOREIGN PATENT DOCUMENTS

WO  2012136450 A1  10/2012

OTHER PUBLICATIONS

3GPP TS 23.003 V12.4.1 3rd Generation Partnership Project; Technical Specification Group Core Network and Terminals; Numbering, addressing and identification (Release 12) Oct. 22, 2014 consisting of 90-pages.
(Continued)

*Primary Examiner* — William D Cumming
(74) *Attorney, Agent, or Firm* — Christopher & Weisberg, P.A.

(57) ABSTRACT

A node for determining a communication resource management algorithm is provided. The node includes a communication interface configured to obtain a measurement characteristic from a network device, and a circuitry containing instructions. When executed, the instructions cause the node to search a container repository to determine the existence of a measurement category for the measurement characteristic obtained from the network device, and when the container repository includes the measurement category for the network device, determine the communication resource management algorithm based at least on the measurement category.

26 Claims, 12 Drawing Sheets

(51) Int. Cl.
*H04W 72/00* (2009.01)
*H04W 72/12* (2009.01)
*H04W 24/10* (2009.01)

(58) Field of Classification Search
USPC .................................. 455/436, 458, 452.1
See application file for complete search history.

(56) References Cited

U.S. PATENT DOCUMENTS

| | | | | |
|---|---|---|---|---|
| 8,606,291 | B2* | 12/2013 | Voyer | H04W 8/065 |
| | | | | 455/436 |
| 8,752,055 | B2* | 6/2014 | Huizenga | G06F 9/4881 |
| | | | | 709/225 |
| 8,817,697 | B2* | 8/2014 | Savarkar | H04W 4/10 |
| | | | | 370/328 |
| 9,420,602 | B2* | 8/2016 | Buyukkoc | H04W 72/1247 |
| 2005/0281248 | A1* | 12/2005 | Aoki | G06Q 30/0281 |
| | | | | 370/351 |
| 2008/0282253 | A1* | 11/2008 | Huizenga | G06F 9/4881 |
| | | | | 718/104 |
| 2009/0042575 | A1* | 2/2009 | Voyer | H04W 8/065 |
| | | | | 455/436 |
| 2009/0163199 | A1 | 6/2009 | Kazmi et al. | |
| 2009/0176513 | A1* | 7/2009 | Bosch | H04W 8/08 |
| | | | | 455/458 |
| 2010/0323700 | A1* | 12/2010 | Bachmann | H04W 36/0066 |
| | | | | 455/436 |
| 2011/0151885 | A1* | 6/2011 | Buyukkoc | H04W 72/1247 |
| | | | | 455/452.1 |
| 2014/0256336 | A1 | 9/2014 | Manssour et al. | |
| 2017/0150516 | A1* | 5/2017 | Stephenne | H04W 72/1257 |
| 2017/0192088 | A1* | 7/2017 | Fluhler | G01S 7/2922 |

OTHER PUBLICATIONS

International Search Report and Written Opinion dated Feb. 3, 2016 for International Application No. PCT/IB2015/054330, International Filing Date: Jun. 8, 2015 consisting of 12-pages.
International Preliminary Report on Patentability dated Jul. 27, 2017 for International Application No. PCT/IB2015/054330, International Filing Date: Jun. 8, 2015 consisting of 9-pages.
Written Opinion of the International Preliminary Examining Authority dated May 4, 2017 for International Application Serial No. PCT/IB2015/054330, International Filing Date: Jun. 8, 2015 consisting of 8-pages.

* cited by examiner

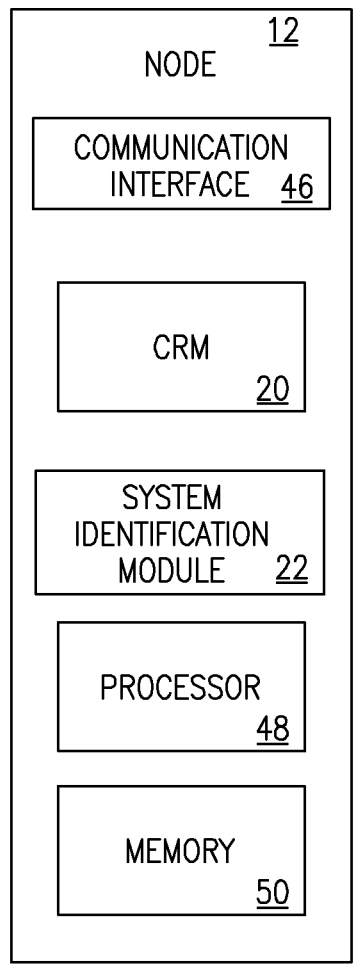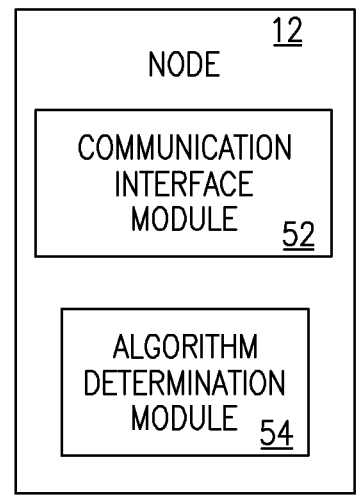
FIG. 4
FIG. 5

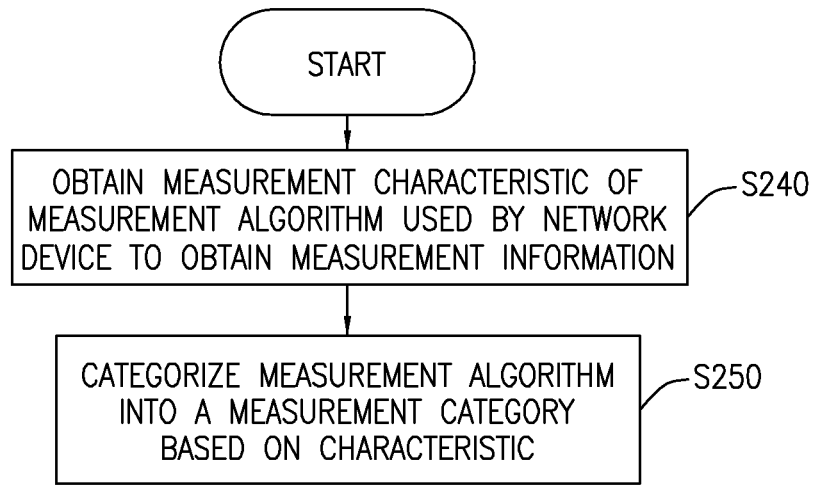
FIG. 10
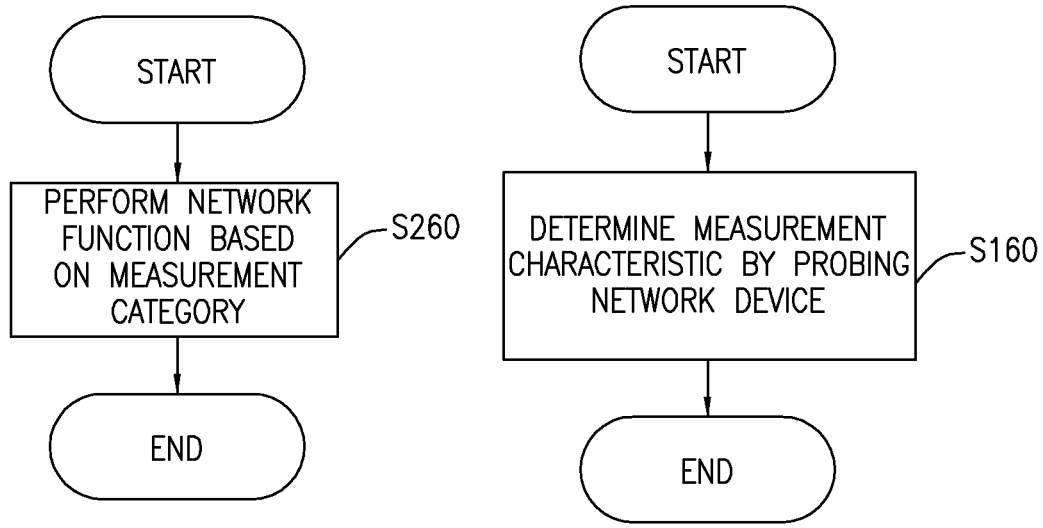
FIG. 11
FIG. 12

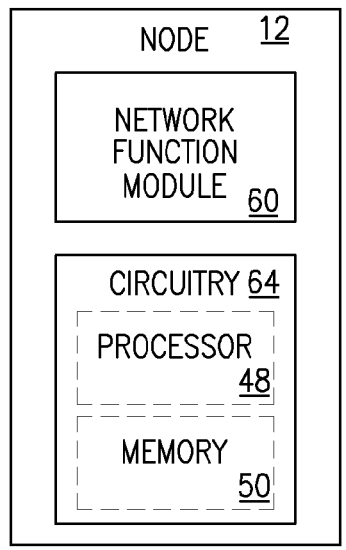
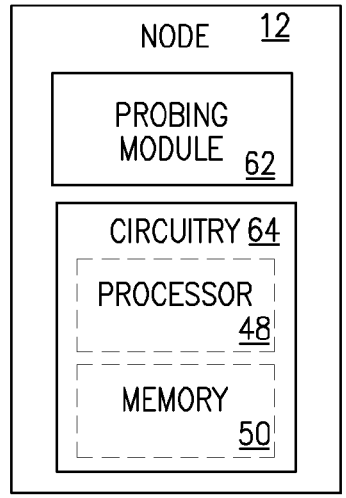
FIG. 19     FIG. 20
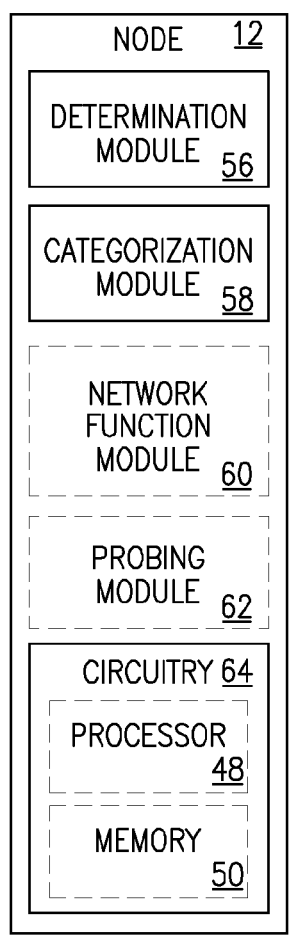
FIG. 21

CLASSIFICATION OF REPORTING ENTITIES FOR COMMUNICATION RESOURCE MANAGEMENT

TECHNICAL FIELD

The present disclosure relates to a method and node for a communication system, and in particular to communication resource management for a network device.

BACKGROUND

Within a network, the functional behavior of a node or network device is often dependent on measurements made at and received from other network nodes or devices. For example, channel state information from mobile devices is used for the efficient operation of mobile communication systems. Standards are used to define the mapping of channel measurements to the bits to be transmitted using radio resource management (RRM) communication algorithms.

However, variations in the same type of measurement information when collected from different network devices operating under same network conditions have been observed. Accordingly, network functions or functional behavior of a network node or device based on such measurement information may be sub-optimal.

There is a need in the art for improving the processing and collection of measurement information from network nodes or devices within a network. In addition, for communication systems, there is a need for improved methods and nodes for determining a communication resource management algorithm that enhance overall communication system performance and provide increased system throughput as compared with existing arrangements.

SUMMARY

The present disclosure advantageously provides improved methods and nodes for determining a communication resource management algorithm. According to one broad aspect of the disclosure, a method for determining a communication resource management algorithm is provided. A measurement characteristic is obtained from a network device. A container repository is searched to determine the existence of a measurement category for the measurement characteristic obtained from the network device. When the container repository includes the measurement category for the network device, the communication resource management algorithm is determined based at least on the measurement category.

According to one embodiment of this aspect, when the container repository does not include the measurement category for the network device, the container repository is updated to include the network device in a determined measurement category, and the communication resource management algorithm is determined based at least on the determined measurement category.

According to another embodiment of this aspect, when the container repository does not include the measurement category for the network device, the measurement category for the network device is determined by offline assessment of a network device measurement algorithm.

According to another embodiment of this aspect, when the container repository does not include the measurement category for the network device, the measurement category for the network device is determined by probing the network device to determine a network device measurement algorithm, the measurement category being based on the determined network device measurement algorithm.

According to another embodiment of this aspect, the probing is a passive probing that does not require modification of operating conditions of a network supporting the network device for the probing. According to another embodiment of this aspect, the probing is an active probing that requires modification of operating conditions of a network supporting the network device. According to another embodiment of this aspect, the modification includes modification of a communication resource manager to probe for filtering of a channel quality indicator in the network device. According to another embodiment of this aspect, the container repository is a database. According to another embodiment of this aspect, the database is in a Mobility Management Entity (MME).

According to another embodiment of this aspect, when the container repository does not include the measurement category for the network device, a default communication resource management algorithm is used to support the network device until the container repository is updated to include the determined measurement category for the network device.

According to another embodiment of this aspect, the communication resource management algorithm is determined from a plurality of communication resource management algorithms stored in a base station where the network device is a wireless device. According to another embodiment of this aspect, the communication resource management algorithm is determined from a plurality of communication resource management algorithms stored in a wireless device where the network device is a base station. According to another embodiment of this aspect, the network device is identified. According to another embodiment of this aspect, obtaining the measurement characteristic from the network device is performed by a first node, and determining the communication resource management algorithm based at least on the determined measurement category is performed by a second node.

According to another broad aspect of the disclosure, a method is provided, where the method includes obtaining a measurement characteristic of a measurement algorithm used by a network device within a network to obtain measurement information and categorizing the measurement algorithm used by the network device into a measurement category based on the measurement characteristic.

According to another embodiment of this aspect, the method includes performing a network function based on the measurement category. According to another embodiment of this aspect, the network is a data communication network and obtaining the measurement characteristic used by the network device includes probing the network device to determine the measurement characteristic.

According to a further embodiment, a node is provided. The node comprises circuitry, the circuitry containing instructions which, when executed, cause the device to perform the method of any of the preceding embodiments. The circuitry may comprise at least one processor and a memory coupled to said processor, the memory containing said instructions.

According to another broad aspect of the disclosure, a node for determining a communication resource management algorithm is provided. The node includes circuitry containing instructions which, when executed, cause the node to obtain a measurement characteristic from a network device, search a container repository to determine an existence of a measurement category for the measurement characteristic obtained from the network device, and when the container repository includes the measurement category for the network device, determine the communication resource management algorithm based at least on the measurement category.

According to another embodiment of this aspect, the instructions are further configured to, when the container repository does not include the measurement category for the network device, update the container repository to include the network device in a determined measurement category and determine the communication resource management algorithm based at least on the determined measurement category.

According to another embodiment of this aspect, the instructions are further configured to, when the container repository does not include the measurement category for the identified type of the network device, determine the measurement category for the network device by obtaining information about a network device measurement algorithm of the network device, via offline assessment of the network device.

According to another embodiment of this aspect, the instructions are further configured to, when the container repository does not include the measurement category for the identified type of the network device, determine the measurement category for the network device by probing the network device to determine a network device measurement algorithm, the measurement category being based on the determined network device measurement algorithm. According to another embodiment of this aspect, the probing is a passive probing that does not require modification of the operating conditions of a network supporting the type of network device for the probing. According to another embodiment of this aspect, the probing is an active probing that requires modification of the operation conditions of a network supporting the identified type of the network device. According to another embodiment of this aspect, the modification includes modification of a communication resource manager to probe for filtering of a channel quality indicator in the identified type of the network device.

According to another embodiment of this aspect, the container repository is a database. According to another embodiment of this aspect, the database is in a Mobility Management Entity. According to another embodiment of this aspect, when the container repository does not include the measurement category for the network device, a default communication resource management algorithm is used to support the network device until the container repository is updated to include the determined measurement category for the network device.

According to another embodiment of this aspect, the network device is a wireless device, and the node is a base station having circuitry comprising a plurality of communication resource management algorithms and instructions that, when executed, further configure the node to determine the communication resource management algorithm from the plurality of communication resource management algorithms.

According to another embodiment of this aspect, the network device is a base station, and the node is a wireless device and circuitry comprising a plurality of communication resource management algorithms and instructions that when executed further configure the node to determine the communication resource management algorithm from the plurality of communication resource management algorithms.

According to another embodiment of this aspect, the instructions are further configured to identify the network device.

According to another broad aspect of the disclosure, a node is provided, where the node includes circuitry containing instructions which when executed cause the node to obtain a measurement characteristic of a measurement algorithm used by a network device within a network to obtain measurement information and to categorize the measurement algorithm used by the network device into a measurement category based on the measurement characteristic.

According to another embodiment of this aspect, the instructions are further configured to perform a network function based on the measurement category of the measurement characteristic, the measurement category based at least on the measurement algorithm used to obtain the measurement characteristic.

According to another embodiment of this aspect, the network is a data communication network and obtaining the measurement characteristic used by the network device includes probing the network device to obtain the management characteristic.

According to another broad aspect of the disclosure, a node for determining a communication resource management algorithm is provided. The node includes a communication interface module configured to obtain a measurement characteristic from a network device, and an algorithm determining module configured to search a container repository to determine the existence of a measurement category for the measurement characteristic obtained from the network device. When the container repository includes the measurement category for the network device, the algorithm determining module is configured to determine the communication resource management algorithm based at least on the measurement category.

According to a further embodiment, a node is provided. The node includes circuitry. The circuitry contains instructions which, when executed, cause the device to perform the method of any of the preceding embodiments. The circuitry may comprise at least one processor and a memory coupled to the processor, in which the memory contains the instructions.

According to a further embodiment, a computer program is provided. The compute program includes instructions which, when executed on at least one processor, cause the at least one processor to carry out the methods according to any of the preceding embodiments.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 4 is a block diagram of an exemplary node for determining a communication resource management algorithm constructed in accordance with the principles of the present disclosure;

FIG. 5 is a block diagram of another embodiment of an exemplary node for determining a communication resource management algorithm constructed in accordance with the principles of the present disclosure;

FIGS. 10-13 are flowcharts of other embodiments of methods according to the present disclosure; and FIGS. 14-21 are block diagrams of other embodiments of nodes according to the present disclosure.

DETAILED DESCRIPTION

Figure 1:
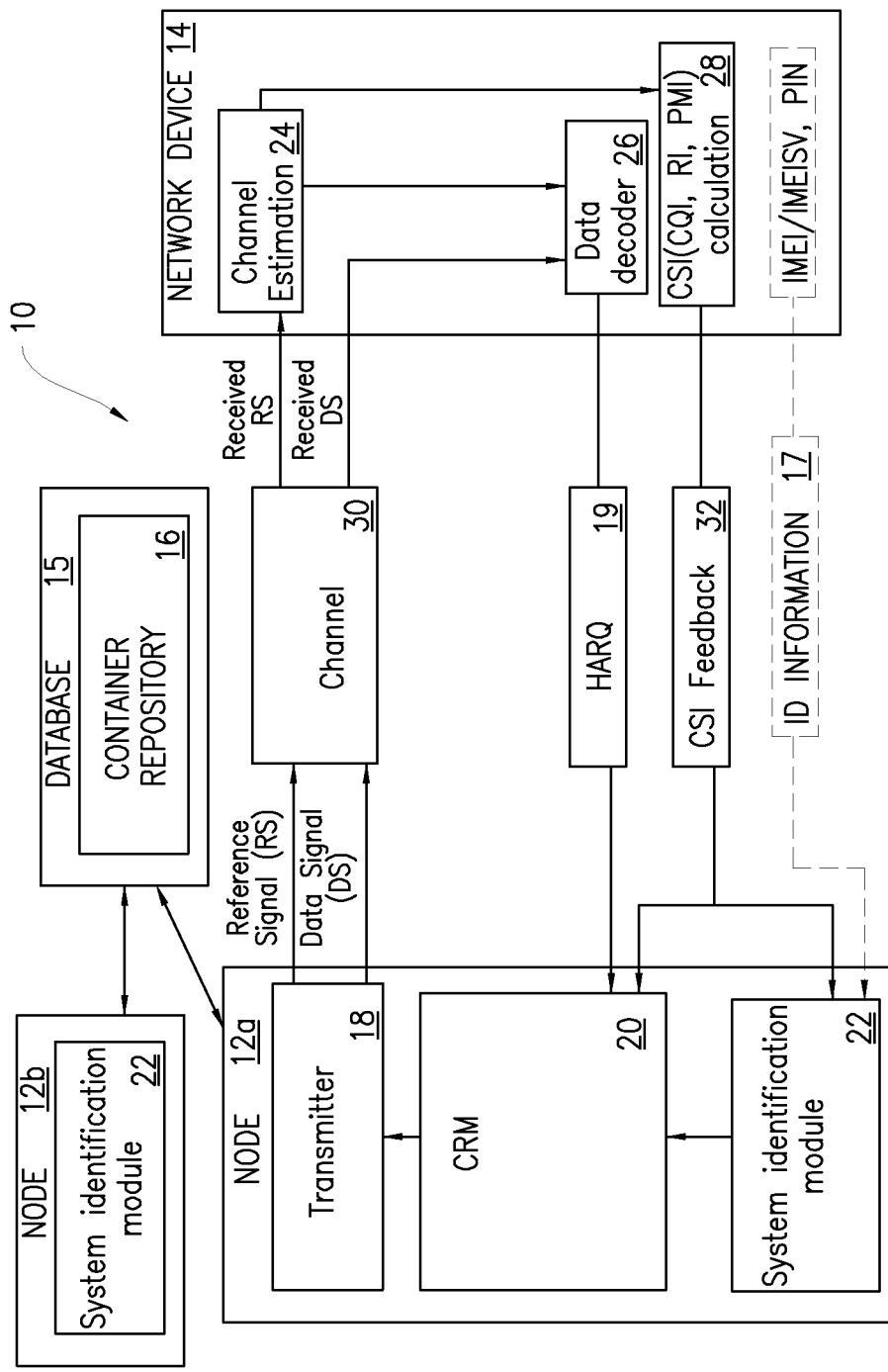
FIG. 1 is a block diagram of a portion of an exemplary communication system including a node configured to determine a communication resource management algorithm constructed in accordance with the principles of the present disclosure.

Algorithms used to obtain the measurements at network devices are often implementation-specific and not defined by a standard. For example, a downlink channel quality indicator (CQI) is obtained from a signal-to-interference-plus-noise (SINR) estimate obtained at a network device, such as a wireless user equipment (UE), and sent to a node such as, for example, a wireless communication network base station such as an enhanced Node B (eNB) in Long Term Evolution (LTE) networks. But the standard does not specify how the SINR estimate is obtained. Accordingly, the characteristics of measurements made at a network device and fed back to a node may vary, for given conditions, from reporting node to reporting node.

Network devices in communication networks may be categorized with respect to their standardized functionalities. They may also be categorized with respect to their international mobile station equipment identity (IMEI) such that network devices of the same or similar make/model/software release and/or serial number may be grouped together. This facilitates troubleshooting or tailoring of network features to the capabilities of the network devices within the same group. However, there is no mechanism to categorize the network devices based on their channel measurement algorithm behavior detected through system identification procedures. Instead, each network device within a specific class is categorized according to the standardized functionality or classified by make/model/software release and/or serial number, and is treated the same way, irrespective of the underlying algorithmic differences in obtaining the measurements that are being reported.

As an example, consider the downlink gain to interference plus noise ratio (GINR) (defined as the signal-to-interference-plus-noise ratio (SINR) normalized by the transmit power) being estimated at a node, such as a base station, from CQI reports sent from a network device. Smoothing of the GINR may be done through filtering to reduce the reported channel fluctuations due to fast fading and/or noise/interference. The adequate level of filtering will depend on the level of temporal filtering which was applied on the network device side to generate the CQI reports. However, the temporal filtering on the network device side may vary from network device vendor to network device vendor, since this is not imposed by the standard. A great deal of time and resources may be spent determining appropriate downlink GINR filter coefficients which achieve a good performance compromise, because quite noticeable performance changes may be seen with different filter value. A "one-configuration-fits-all approach" is not ideal, especially with customized wireless devices. This results in a selection of less-than-optimal communication resource management (CRM) algorithms.

Further, because commercial wireless devices are designed and manufactured at very large volume based on market need and the economies of scale, the impact of implementation differences could be large if the utilization of channel state information (CSI) at the base station is biased towards one particular implementation. Methods and nodes of embodiments described herein advantageously provide for the determination of communication resource management algorithms that are based on measurement characteristics obtained from network devices. The measurement characteristics may be obtained from the network devices by offline assessment and/or probing the network devices' measurement algorithms. By obtaining the measurement characteristics for each network device, a container repository may be updated to include the network device within a determined measurement category. This information may be used for differentiated handling of each network device rather than uniformly handling network devices according to standard network device identification parameters such as, for example, their make, model and/or serial number. Thus, the communication resource management algorithm determination procedure is adapted not only to measurements reported from other nodes and/or network devices but to specific characteristics associated with algorithms used to obtain these measurements and may span multiple network device types. The result of this differentiated handling procedure may benefit overall system performance and provides increased system throughput as compared with existing arrangements.

Before describing in detail exemplary embodiments that are in accordance with the disclosure, it is noted that the embodiments reside primarily in combinations of apparatus components and processing steps related to determining communication resource management algorithms. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In addition, the terms "class" and "category" are used interchangeably herein as well as the terms "classifying" and "categorizing."

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system "10" for determining communication resource management algorithms for a network device based on measurement characteristics obtained from the network device in accordance with some principles of the present disclosure and. However, before describing embodiments of the communication resource management algorithm determination process, components and other processes of system 10 will be described in detail with respect to FIG. 1 to provide a general understanding of an algorithm determination process disclosed herein.

Communication system 10 includes nodes 12 such as nodes 12a and 12b (referred to collectively herein as node 12). For simplicity, only two nodes 12a and 12b are shown in FIG. 1, it being understood that more or fewer than two nodes 12 may be implemented. Communication system 10 also includes one or more network devices 14. For simplicity, only one exemplary network device 14 is shown in FIG. 1, it being understood that communication system 10 may include more than one network device 14. Communication system 10 also includes a database 15. Database 15 includes a container repository 16, which represents a logical data storage element located in database 15. It is within the scope of the present disclosure that database 15 be considered any type of database including but not limited to any combination of one or more of a relational database, an operational database, or a distributed database. Further, database 15, including container repository 16, could be located within a mobility management entity (MME) or any other network element.

Container repository 16 may include network device capability information that includes information regarding the identity and capability of each network device 14 to allow node 12 to establish and maintain efficient communications with network device 14. This information may be maintained in communication system 10 during handovers. In addition, container repository 16 may be checked to see if there exists any network device measurement categories that network device 14 should be associated with, based on measurement algorithms and the desired differentiation in the handling of network device 14. If the handling of a new release of network device 14 requires the creation of a new category, or the updating of an existing category that lacks the network device measurement characteristics, the category may be created and/or updated accordingly, and a specialized handling of the new network device 14 may be defined.

In an exemplary embodiment and as described in greater detail below, the system identification process performed by system identification module 22 evaluates the reported CQI as the downlink channel quality varies. In one embodiment, the downlink gain to interference plus noise ratio (GINR) is estimated at node 12 from the CQI reports sent from network device 14. Some level of smoothing of the GINR may be done through filtering by a GINR filtering module to reduce the reported channel fluctuations due to fast fading and/or noise interference. The adequate level of filtering depends on the level of temporal filtering which was applied by network device 14 to generate the CQI reports. However, the level of temporal filtering performed by network device 14 may vary from network device vendor to network device vendor since this is not imposed by a standard. System identification module 22 may then determine the amount of filtering done by the measurement algorithm for network device 14. Based on this information, the amount of filtering done in node 12 for the GINR associated with network device 14 may be adjusted accordingly by an outer-loop adjustment module in a communication resource manager (CRM) 20. Thus, instead of setting the same GINR filtering coefficients for all network devices 14, the filtering coefficients may advantageously be set appropriately for those particular network devices 14 identified as belonging to the same CQI reporting measurement category.

Using the above approach, container repository 16 within database 15 thus maintains a current view of network device-specific container content associated with measurement categories for each network device 14. CRM 20 may then select or configure an appropriate CRM algorithm for network device 14 in view of the specific handling needs necessary for each category.

In one embodiment, node 12 is a base station, such as an eNB and network device 14 is a wireless device, which may include, for example, user equipment (UE), including devices used for machine type communication, machine to machine communication, sensors, USB, wireless embedded device, laptop mounted devices, etc. Node 12 includes a transmitter 18, CRM 20, such as a radio resource manager (RRM), and a system identification module 22. Network device 14 includes a channel estimation module 24, data decoder 26, and a CSI calculation module 28. CRM 20 may also include a link adaptation module which may be configured for matching of modulation, coding, and/or other signal and protocol parameters to network conditions. CRM 20 may also include a scheduler which may be responsible for distributing resources such as time, frequency, and/or power among other requesting network devices 14 and nodes 12. In one embodiment, hybrid automatic repeat request (HARQ) 19 may be used as a high-rate forward error-correcting coding and automatic repeat request (ARQ) error-control mechanism.

Node 12 and network device 14 communicate with each other over a wireless communication channel 30. Reference signals and data signals are transmitted from transmitter 18 via a communication interface of node 12 over wireless communication channel 30. In one embodiment, CRM 20 may be used to provide radio RRM functionality for wireless communication channel 30. In one embodiment wireless communication channel 30 is a multiple-input and multiple-output (MIMO) channel that allows transmission and receipt of more than one data signal on the same radio channel at the same time. The reference signal is received by channel estimation module 24 of network device 14 and the data signal is received by data decoder 26. Identification information 17 about each network device 14 including, for example, any combination of its international mobile station equipment identity (IMEI), international mobile station equipment identity software version (IMEISV) and personal identification number (PIN) may be fed back from each network device 14 to node 12 and be used by node 12 to identify each network device 14 according to their standard functionalities.

In one embodiment of the present disclosure, channel state information (CSI) information 32 is also obtained from each network device 14 and fed back to node 12 through the communication interface of node 12. CSI information 32 is calculated in network device 14, in particular within CSI calculation module 28 and may include, for example, network device identity codes for the network device measurement classes, and/or network device class characterizations such as CQI offset or a pre-coding matrix indicator (PMI) or rank indicator (RI). CSI information 32 may then be used by system identification module 22 to further categorize each network device 14 according to its respective channel measurement algorithm behavior.

It is within the scope of the present disclosure to include system identification module 22 within node 12a or within a device providing database 15, such as an MME. System identification module 22 receives and stores CSI information 32 from network device 14. System identification module 22 also creates and updates the network device measurement class information, exchanges the measurement class information among other network nodes, e.g., node 12b, processes the measurement class information, provides the measurement class information to CRM 20 to adapt the CRM algorithm to the network device measurement classes and provides CSI information 32 to CRM 20 and/or container repository 16 for active system identification.

Figure 2:
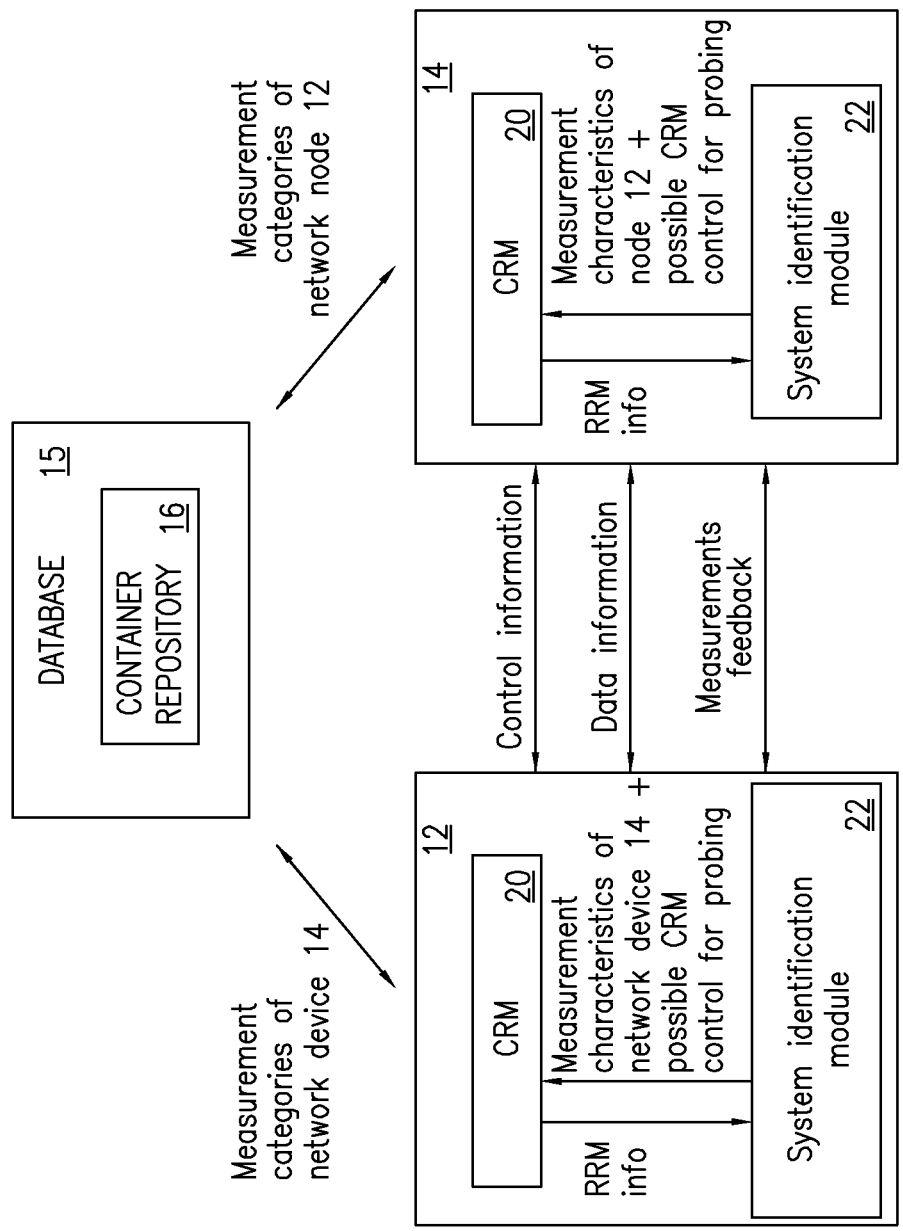
FIG. 2 is a block diagram of a portion of an exemplary communication system illustrating a node and a network device, either of which may be configured to determine a communication resource management algorithm constructed in accordance with the principles of the present disclosure.

Turning now to FIG. 2, there is illustrated a block diagram of a portion of an exemplary communication system illustrating node 12 and network device 14, either of which may determine communication resource management algorithms in accordance with the principles of the present disclosure. FIG. 2 illustrates the adaptability of the present disclosure by showing that system identification module 22 need not be located only in a base station, i.e., node 12, and use measurement characteristics from a network device 14 to determine communication resource management algorithms for that network device 14. System identification module 22 may also be located in a network device 14 and use measurement characteristics from a network node 12 to determine communication resource management algorithms for node 12. The present disclosure includes various embodiments where node 12 could be a base station and network device 14 could be a wireless device and where a plurality of communication resource management algorithms may be stored in either device. For example, in one embodiment, the communication resource management algorithm for network device 14 is determined from a plurality of communication resource management algorithms stored in node 12, which could be, for example, a base station where network device 14 is a wireless device.

In another embodiment, the communication resource management algorithm for node 12 is determined from a plurality of communication resource management algorithms stored in network device 14 which is a wireless device and where node 12 is a base station.

In one embodiment, node cooperation could be used. For example, a node that does the uplink channel estimation might be a different node than the node that does the quantization and/or reporting in the downlink transmission. In such a fashion, categorization of the measurement algorithms may depend on the algorithmic design in multiple nodes involved in the measurement and reporting phases. For example, if node 12a, which is doing the uplink reception and channel estimation is different from the node, for example, node 12b, that is doing the quantization and downlink transmission, it is possible that the categorization of the measurement algorithms will depend on both nodes. Thus, a first node 12a may obtain the measurement characteristic from network device 14, and a second node 12b may determine the communication resource management algorithm based at least on the determined measurement category.

Referring again to FIG. 2, node 12 and network device 14 exchange data and control information. In addition, measurement characteristics about network device 14 are obtained by node 12. System identification module 22 uses the measurement characteristics, in addition to other information such as resource management assignments such as time, frequency, power, precoders, codes, etc., received from the CRM 20, and control information sent from network device 14 to perform a variety of functions. For example, system identification module 22 may search container repository 16 to determine the existence of measurement categories for the measurement characteristics obtained from network device 14. Container repository 16 may be part of a centralized or distributed database 15, and may contain categories for the measurement characteristics of network devices 14. If container repository 16 already includes the measurement category for network device 14, CRM 20 determines a CRM algorithm based upon the measurement category. On the other hand, if container repository 16 does not include the measurement category for network device 14, system identification module 22 may update container repository 16 to include network device 14 in a determined measurement category. In one embodiment, system identification module 22 feeds the information regarding the determined measurement category to CRM 20 which may then determine the appropriate communication resource management category algorithm from a plurality of stored algorithms based at least on the determined measurement category. In another embodiment, CRM 20 may obtain the information regarding the determined measurement category directly from container repository 16.

Although FIG. 2 illustrates principles of embodiments of the disclosure with respect to a networks node 12 and a network device 14, the principles described may apply also only between two or more network nodes, between two or more network devices, or between any combination of network nodes and network devices. Thus, in a broader aspect, the network device 14 of FIG. 2 could be viewed as a network node and vice-versa.

Figure 3:
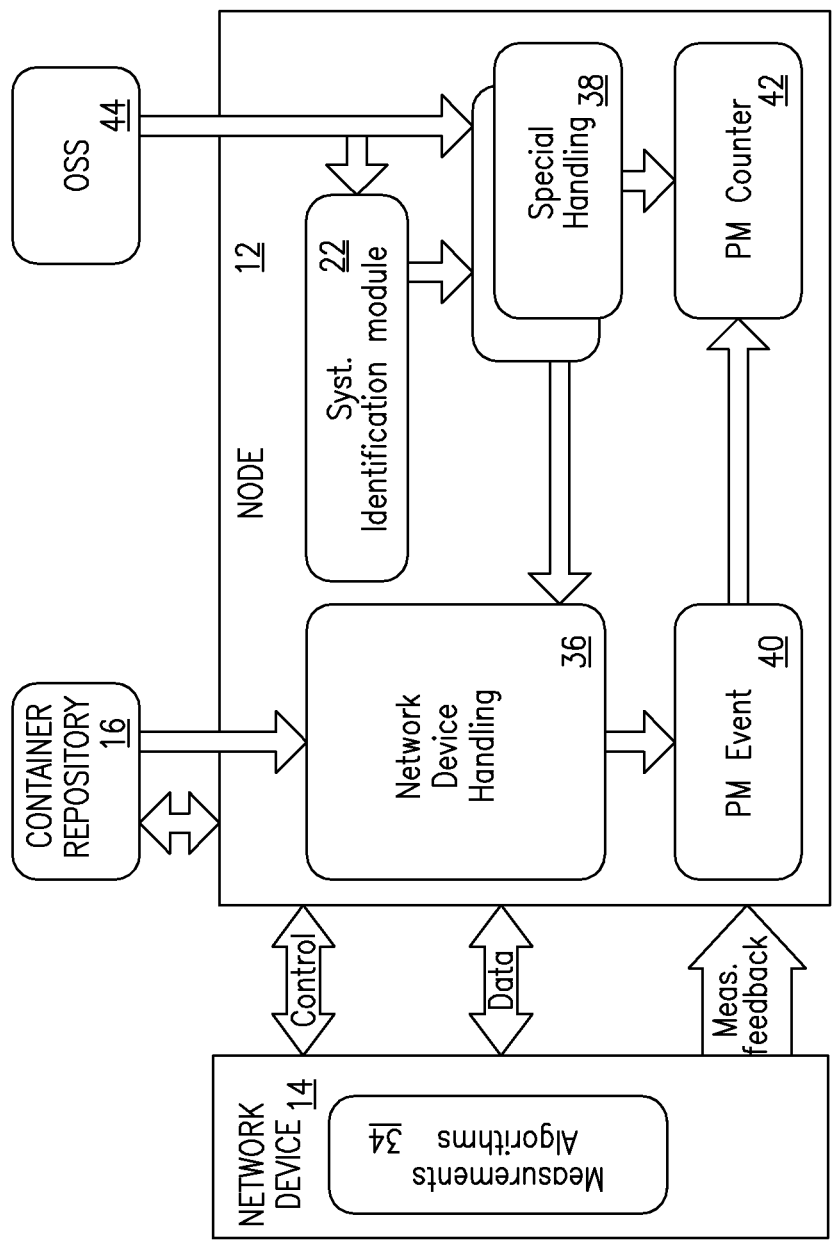
FIG. 3 is a block diagram of an exemplary node including a system identification module constructed in accordance with the present disclosure.

Turning now to FIG. 3, there is illustrated an exemplary node 12 in communication with an exemplary network device 14. As described above, node 12 and network device 14 exchange control and data signals. Measurement information is also obtained by node 12. The measurement information includes measurement algorithms 34 for network device 14. Measurement algorithms 34 may include, for example, an estimate of the power received by node 12. This is obtained by averaging the magnitude squared of the channel estimate over a certain time and/or frequency interval. In other embodiments, measurement algorithms 34 may include, instead of power, the SINR. Measurement algorithms 34 are used by system identification module 22 located in node 12 to provide special handling 38 of each network device 14 through the use of measurement categories for each network device 14 sharing the same measurement algorithms. As described above, categories within container repository 16, which may be part of database 15, may be updated and/or created to include the network device measurement algorithms. Thus, node 12 includes not only a network handling module 36, which uses standard identification information for each network device, but via system identification module 22, also provides specialized handling 38 by categorizing network devices according to similar network device measurement algorithms.

Operation support system (OSS) 44 configures system identification module 22 and special handling module 38. OSS 44 may, for example, be used to add a measurement class or category and any new special handling rules for the newly created class or category. Special handling module 38 may influence how performance monitor (PM) events 40 are used to generate PM counters 42. In one embodiment, PM counter 42 could count the number of PM events 40 associated with certain classes or categories of network devices 14 separately.

FIG. 4 illustrates a block diagram of an exemplary node 12 for determining a communication resource management algorithm constructed in accordance with the principles of the present disclosure. Node 12 includes a communication interface 46 configured to obtain a measurement characteristic from network device 14, CRM 20 and system identification module 22, which includes a processor 48, and memory 50. Memory 50 stores instructions that, when executed, configure processor 48 to perform a number of functions. For example, processor 48 searches a container repository 16 to determine an existence of a measurement category for the measurement characteristic obtained from network device 14. If container repository 16 includes the measurement category for network device 14, processor 48 determines a communication resource management algorithm for network device 14, from a plurality of communication resource management algorithms stored in CRM 20, based at least on the measurement category. If container repository 16 does not include the measurement category for network device 14, processor 48 updates container repository 16 to include network device 14 in a determined measurement category, and determines the communication resource management algorithm from a plurality of communication resource management algorithms stored in CRM 20, based at least on the determined measurement category.

FIG. 5 illustrates a block diagram of another embodiment of an exemplary node for determining a communication resource management algorithm constructed in accordance with the principles of the present disclosure. In the embodiment illustrated in FIG. 5, node 12 includes a communication interface module 52 and an algorithm determination module 54. Communication interface module 52 obtains a measurement characteristic from network device 14. Algorithm determining module 54 searches container repository 16 to determine the existence of a measurement category for the measurement characteristic obtained from network device 14. If container repository 16 includes the measurement category for network device 14, algorithm determining module 54 determines the communication resource management algorithm based at least on the measurement category. If container repository 16 does not include the measurement category for network device 14, algorithm determining module 54 may optionally update container repository 16 to include the network device 14 in a determined measurement category, and may determine the communication resource management algorithm based at least on the determined measurement category.

Figure 6:
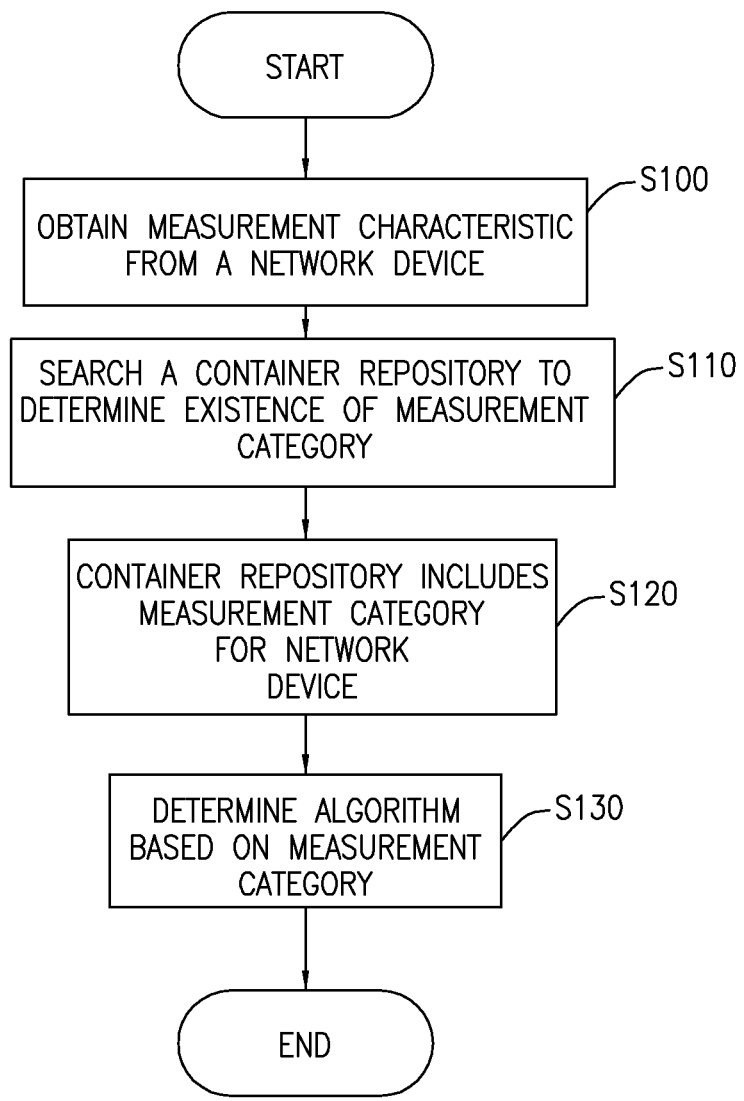
FIG. 6 is a flowchart of an exemplary communication resource management algorithm determination process in accordance with the principles of the present disclosure.

Turning now to FIG. 6, a flowchart is shown illustrating the process performed by the communication resource management algorithm determination method of the present disclosure. Initially, a communication interface of node 12 obtains measurement characteristics from a network device 14 (Block S100). Optionally, network device 14 may be previously identified, such as based on at least one of an international mobile station equipment identity, IMEI, and an IMEI software version, IMEISV. As described above, system identification module 22 may be located in node 12 and the measurement characteristics of one or more network devices 14 may be obtained. Alternately, the system identification module 22 may be located in a network device 14 and the measurement characteristics of one or more nodes 12 may be obtained. In FIG. 6, the scenario where the measurement characteristics of a network device 14 are obtained by a node 12 is illustrated. Processor 48 searches container repository 16 for a measurement category for network device 14 (Block S110) and determines that container repository 16 includes a measurement category for network device 14 (Block S120). Processor 48 then determines the communication resource management algorithm based at least on the measurement category (Block S130).

Figure 7:
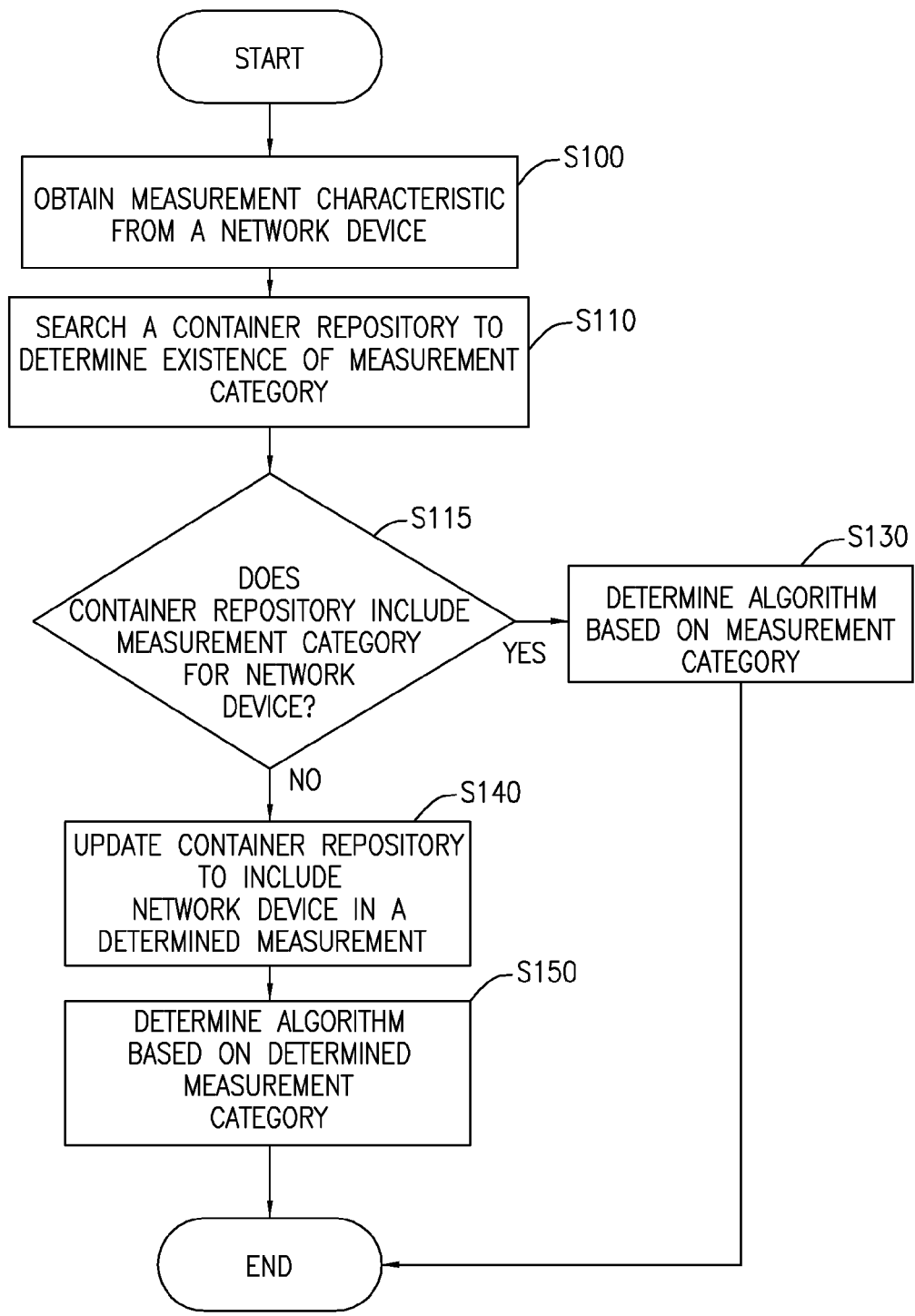
FIG. 7 is a flowchart of another exemplary communication resource management algorithm determination process in accordance with the principles of the present disclosure.

It is contemplated that container repository may not have a measurement category for network device 14 either because the measurement characteristics for the category are not present in an existing container or because no container exists for the measurement characteristic type. Turning now to FIG. 7, a flowchart is shown illustrating an alternate process performed by the communication resource management algorithm determination method of the present disclosure in the case where container repository may not have a measurement category for network device 14. As described above with respect to FIG. 6, a communication interface of node 12 obtains measurement characteristics from a network device 14 (Block S100). Optionally, network device 14 may be previously identified, such as based on at least one of an international mobile station equipment identity, IMEI, and an IMEI software version, IMEISV. Processor 48 searches container repository 16 for a measurement category for network device 14 (Block S110). Processor 48 determines if container repository 16 includes a measurement category for network device 14 (Block S115) and if it is determined that container repository 16 includes the measurement category for network device 14, processor 48 determines the communication resource management algorithm based at least on the measurement category (Block S130). If processor 48 determines that container repository 16 does not include the measurement category for network device 14, processor 48 updates container repository 16 to include network device 14 in a determined measurement category (Block S140) and determines the communication resource management algorithm based at least on the determined measurement category (Block S150).

Figure 8:
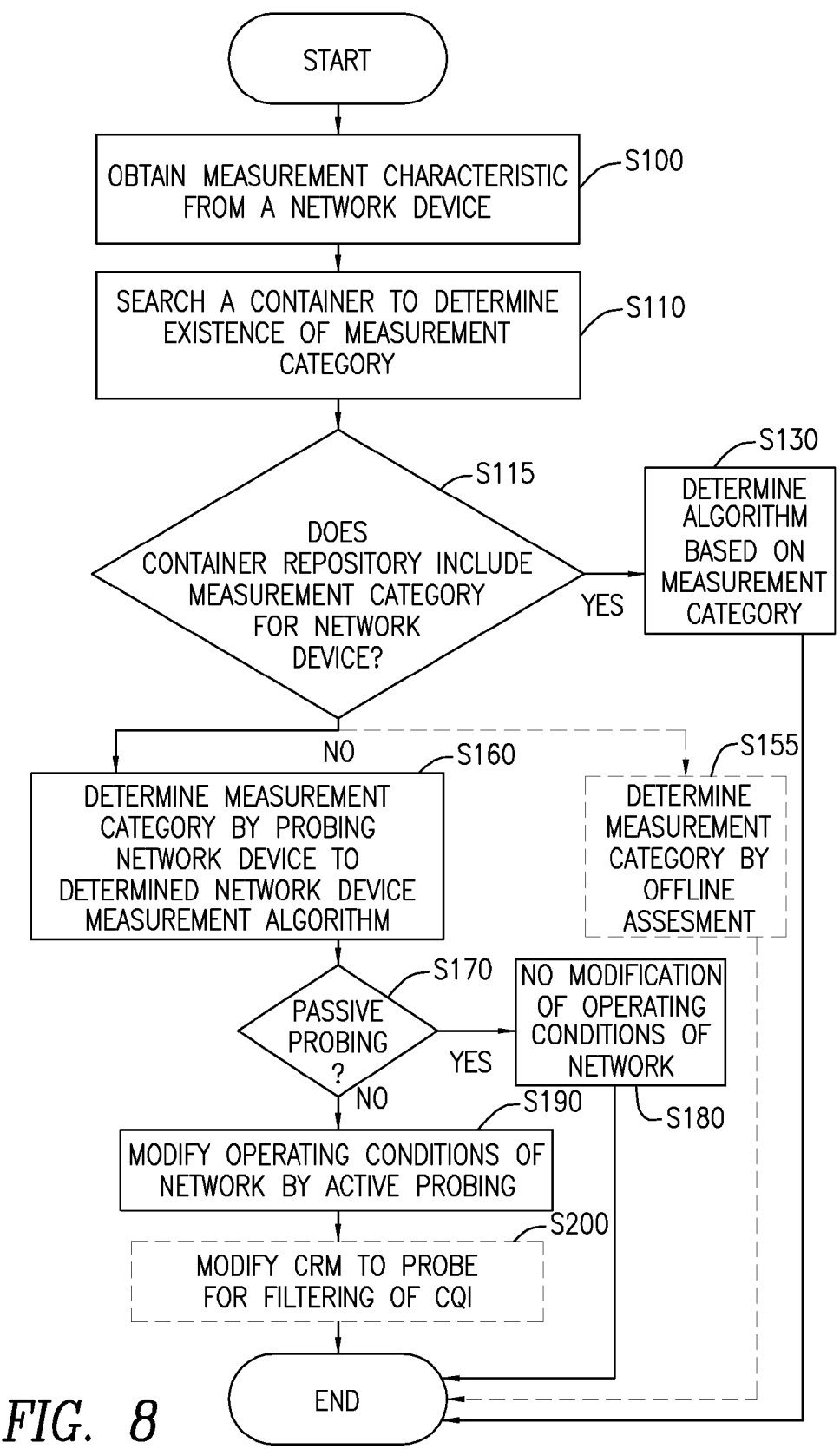
FIG. 8 is a flowchart of another embodiment of the exemplary communication resource management algorithm determination process including offline assessment and/or probing of the network device in accordance with the principles of the present disclosure.

Turning to FIG. 8, another embodiment of the algorithm determination process is illustrated where the container repository may not have a measurement category for network device 14. In the case of FIG. 8, the process is expanded to include arrangements for the determination of the measurement category. Similar to the processes shown in FIGS. 6 and 7, a communication interface in node 12 obtains measurement characteristics from a network device 14 (Block S100). Optionally, network device 14 may be previously identified, such as based on at least one of an international mobile station equipment identity, IMEI, and an IMEI software version, IMEISV. Processor 48 searches container repository 16 for a measurement category for network device 14 (Block S110). Processor 48 determines if container repository 16 includes a measurement category for network device 14 (Block S115) and when it is determined that container repository 16 includes the measurement category for network device 14, processor 48 determines the communication resource management algorithm based at least on the measurement category (Block S130). However, if processor 48 determines that no measurement category exists for network device 14, processor 48 determines the measurement category by offline assessment of network device 14 (Block S155) and/or probing network device 14 to determine a network measurement algorithm for the network device 14 (Block S160). Probing of network device 14 for measurement algorithms may be made in a controlled lab environment or in a live network, either passively or actively. In one embodiment, passive probing is used. If is determined that passive probing is to be used (Block S170), the operating conditions of the network supporting network device 14 are not modified for probing purposes (Block S180). In another embodiment, active probing is used. Active probing requires modification of the of the operating conditions of the network supporting network device 14 (Block S190) for the sole purpose of probing network device 14 such as modifying CRM 20 to, for example, probe for filtering of a channel quality indicator in the network device (Block S200). In active probing, the probing may be in a very localized manner so as to have little or no macroscopic network impact.

In an exemplary embodiment for CQI measurement probing, passive probing could be implemented by monitoring the CQI reports while normal network operation is ongoing. The temporal memory of the filtering used to generate the CQI reports may be estimated by looking at what occurs when certain resource blocks are blank or used by certain interference network devices 14. By contrast, in active probing, CRM 20 could be modified for the sole purpose of probing the filtering of the CQI in certain network devices 14, for example, by alternatively forcing certain communication resources to toggle from zero power to full or partial power. Passive probing relies on visibility of the CRM assignments while active probing requires some level of controllability. Visibility and/or controllability may be at a local level, i.e., at a network device level, however, the wider the visibility/controllability geographical area, the more powerful probing capabilities available. For example, if joint CRM observability and/or controllability among a cluster of nodes 12 is possible, probing of the measurement algorithms used by network devices 14 for CQI calculation is facilitated since there are more states in the input/output signals available for system identification.

In some embodiments, probing (either active or passive) may be performed such as to take advantage of existing specific network operating conditions. For example, probing may be performed at high network load and/or at low network load, and/or at certain times of the day, week, year, specific schedules, etc. associated with specific operating conditions.

In other embodiments, rather than probe network device 14, the network device measurement algorithm may be assessed offline, without the need for probing. This may be done, for example, by estimating network device characteristics in a lab prior to software releases or on a live network by exploiting the IMEI/SV to target network devices 14 for system identification. This identification in a live network could be done without the need of additional signaling overhead by using system identification processes. Offline assessment of network device 14 may include various methods of fetching existing information regarding the network device 14, including but not limited to checking design information, checking document specifications, diagrams, source code, etc.

Figure 9:
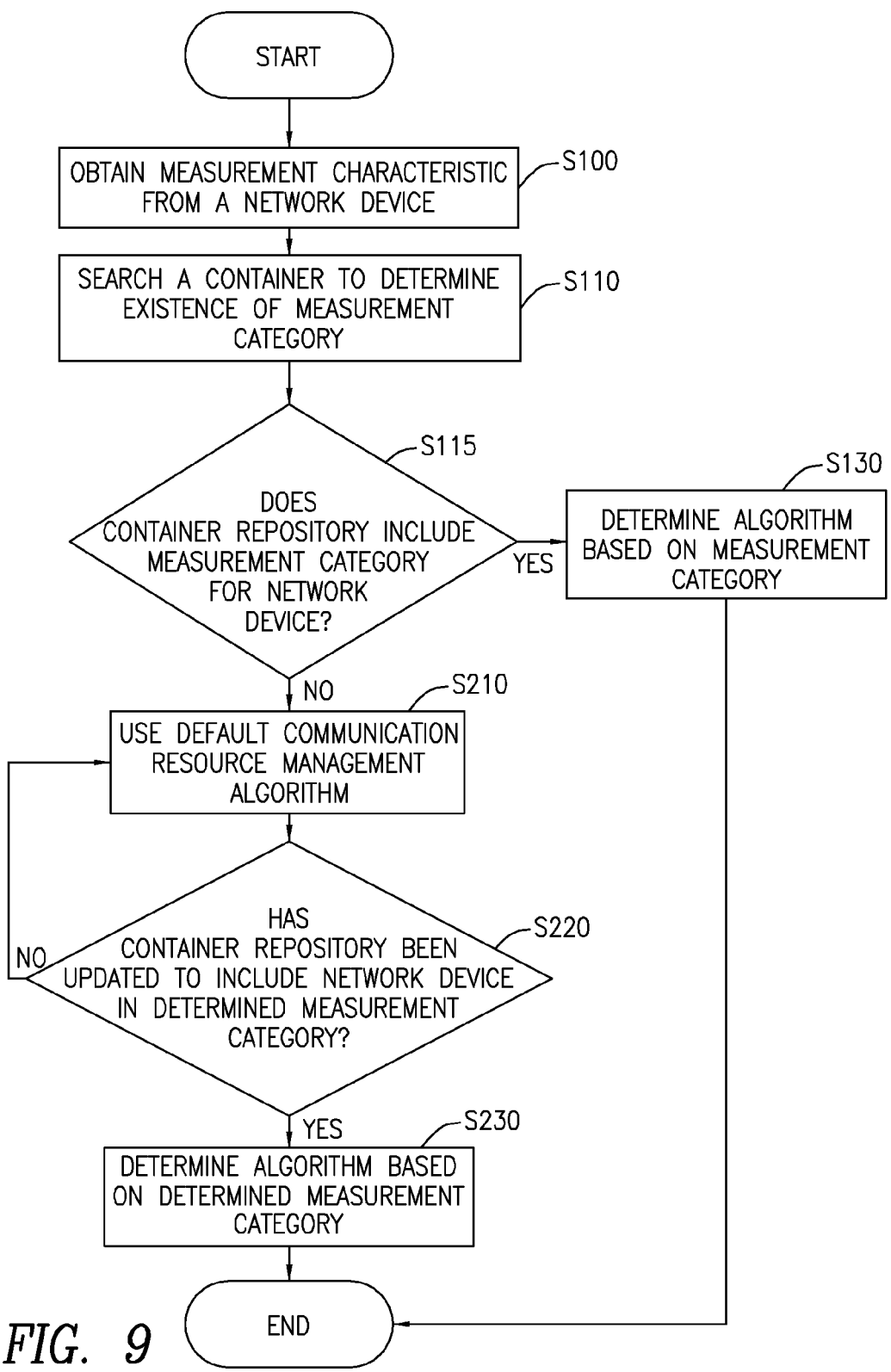
FIG. 9 is a flowchart of yet another embodiment of the exemplary communication resource management algorithm determination process including use of a default communication resource management algorithm in accordance with the principles of the present disclosure.

In FIG. 9, an alternate embodiment is shown that includes the use of a default communication resource management algorithm when no measurement category is determined to exist in the container repository. A communication interface in node 12 obtains measurement characteristics from a network device 14 (Block S100).

Optionally, network device 14 may be previously identified, such as based on at least one of an international mobile station equipment identity, IMEI, and an IMEI software version, IMEISV. Processor 48 searches container repository 16 for a measurement category for network device 14 (Block S110). Processor 48 determines if container repository 16 includes a measurement category for network device 14 (Block S115) and when it is determined that container repository 16 includes the measurement category for network device 14, processor 48 determines the communication resource management algorithm based at least on the measurement category (Block S130). If processor 48 determines that container repository 16 does not include a measurement category for network device 14, a default communication resource management algorithm is used to support network device 14 (Block S210) until it is determined that container repository 16 is updated to include the determined measurement category for network device 14 (S220). If container repository 16 has been updated, processor 48 determines the communication resource management algorithm based at least on the determined measurement category (Block S230). If container repository 16 has not been updated, the default communication resource management algorithm to support network device 14 continues to be used (Block S210).

FIGS. 10-13 illustrate methods according to other embodiments of the present disclosure. According to the method illustrated in FIG. 10, initially a measurement characteristic of a measurement algorithm used by a network device 14 within a network to obtain measurement information (S240) is obtained. Next, the measurement algorithm used by the network device 14 is categorized into a measurement category based on the measurement characteristic (S250).

FIG. 11 illustrates a method according to another embodiment of the present disclosure. The method comprises the steps of performing a network function based on a measurement category of a measurement characteristic of a measurement algorithm used by a network device 14 within a network to obtain measurement information (S260).

FIG. 12 illustrates a method according to yet another embodiment of the present disclosure. The method comprises the step of probing a network device 14 or node 12 to determine the measurement characteristic (S160), wherein the network is a data communication network.

Figure 13:
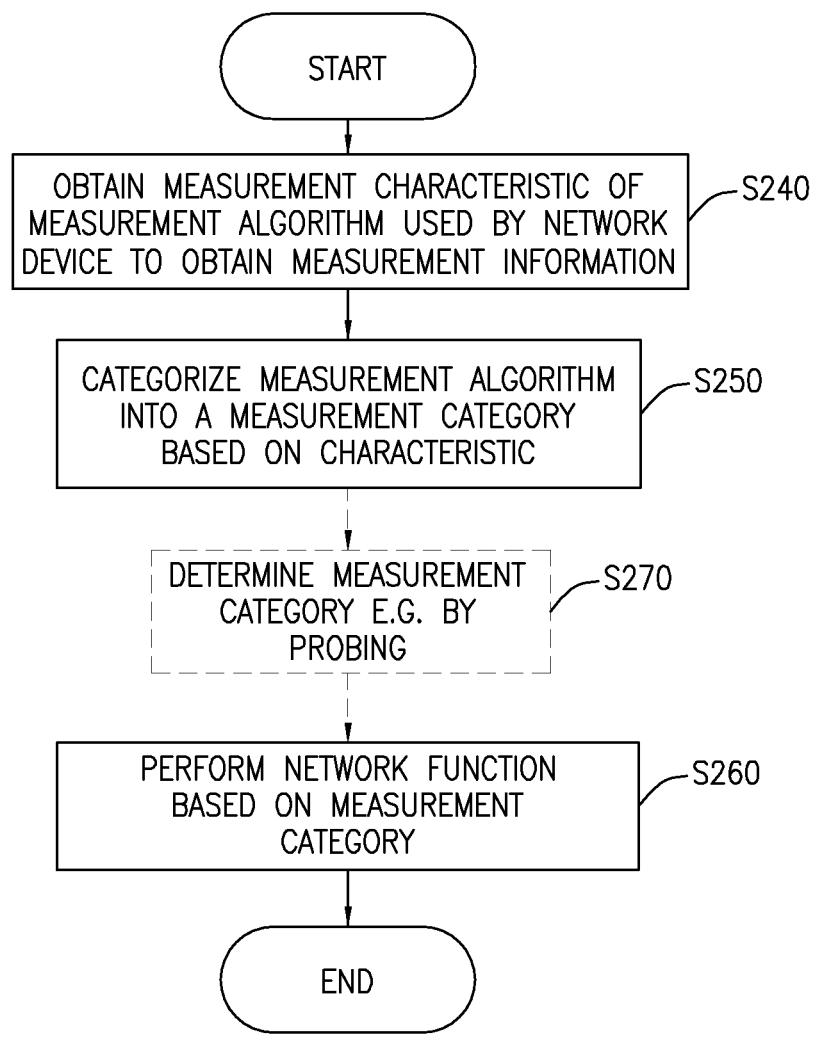

Turning now to FIG. 13, still another alternate embodiment of the methodology of the present disclosure is illustrated. Initially a measurement characteristic of a measurement algorithm used by a network device 14 within a network to obtain measurement information is obtained (S240). Next, the measurement algorithm used by the network device 14 is categorized into a measurement category based on the measurement characteristic (S250).

A network function is then performed where the function is based on the measurement category of the measurement characteristic (Block S260). In one embodiment, the network is a data communication network and determining the measurement algorithm used by network device 14 includes offline assessment and/or probing the network device to determine the measurement algorithm to obtain communication channel measurement information within the data communication network (S270). As discussed above, probing of network device 14 may be either passive or active, where passive probing does not modify the data communication network, while active probing results in a modification of the data communication network.

Figure 14:
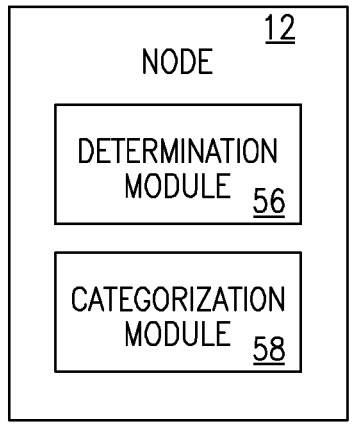

FIGS. 14-17 illustrate examples of nodes 12 comprising modules adapted to perform the respective methods in FIGS. 11-13. FIG. 14 illustrates node 12. Node 12 includes a determination module 56 and a categorization module 58. Determination module 56 is configured to obtain a measurement characteristic of a measurement algorithm used by network device 14 within a network to obtain the measurement information. Categorization module 58 is configured to categorize the measurement algorithm used by network device 14 into a measurement category based on the measurement characteristic.

Figure 15:
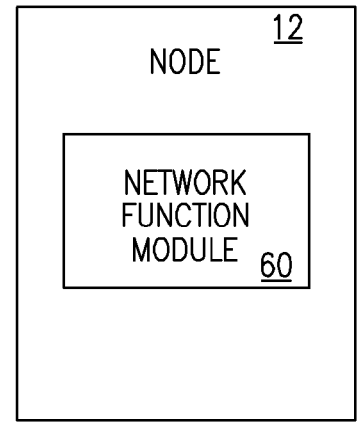

FIG. 15 illustrates node 12 where, in another embodiment, node 12 includes network function module 60. Network function module 60 is configured to perform a network function based on the measurement category of the measurement characteristic. The measurement category is based at least on the measurement algorithm used to obtain the measurement characteristic.

Figure 16:
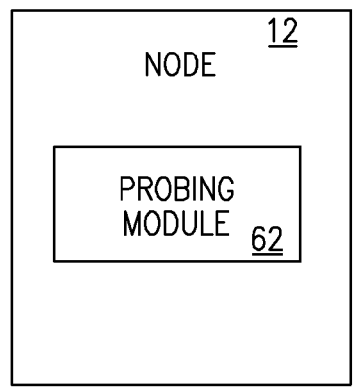
Figure 18:
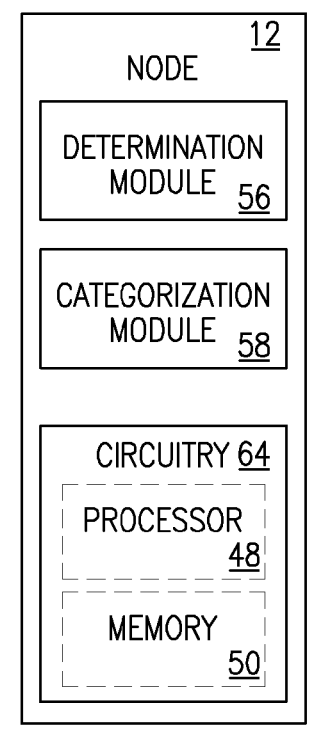

FIG. 16 illustrates node 12 where, in another embodiment, node 12 includes a probing module 62. In one embodiment, the network is a data communication network and probing module 62 is configured to obtain the measurement characteristic used by network device 14 by probing network device.

Figure 17:
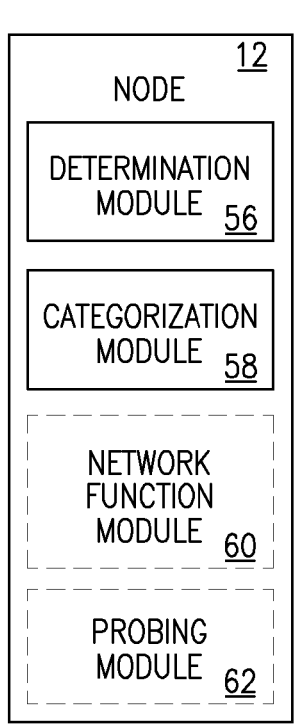

FIG. 17 illustrates node 12, where, in another embodiment, node 12 includes determination module 56, categorization module 58, and, optionally, network function module 60 and probing module 62.

FIGS. 18-21 illustrate circuitry containing instructions, which, when executed, cause the nodes to perform methods of the respective methods in FIGS. 11-13. According to the illustrated embodiments, the circuitry comprises at least one processor and memory coupled to the processor, the memory containing said instructions. For example, in FIG. 18, node 12 includes determination module 56, categorization module 58, and, optionally, circuitry 64, which may include processor 48 and memory 50. In FIG. 19, node 12 includes network function module 60, and, optionally, circuitry 64, which may include processor 48 and memory 50.

In FIG. 20, node 12 includes probing module 62, and, optionally, circuitry 64, which may include processor 48 and memory 50.

In FIG. 21, node 12 includes determination module 56, categorization module 58, and optionally, network function module 60 and probing module 62, and, optionally, circuitry 64, which may include processor 48 and memory 50.

Methods and nodes according to some embodiments of the present disclosure may advantageously use, in a CRM algorithm, a device specific factor for a reported channel state information, e.g. rank of channel. Channel state information, e.g. rank of channel, may be reported differently by various vendors, with some vendors reporting it more pessimistically, while others reporting it more optimistically.

Furthermore, methods and nodes according to some embodiments of the present disclosure may advantageously speed up the convergence of an outer loop adjustment algorithm by using device specific channel state information (e.g. CQI) offsets.

Even further, methods and nodes according to some embodiments of the present disclosure may include changing/updating existing measurement categories, according to need, and/or also removing/deleting any unnecessary or obsolete measurement categories.

OTHER EMBODIMENTS

Embodiment 1

A method for determining a communication resource management algorithm, where the method includes obtaining a measurement characteristic from a network device (S100), searching a container repository to determine an existence of a measurement category for the measurement characteristic obtained from the network device (S110), and when the container repository includes the measurement category for the network device (S120), determining the communication resource management algorithm based at least on the measurement category (S130).

Embodiment 2

The method of embodiment 1, further including, when the container repository does not include the measurement category for the network device, updating the container repository to include the network device in a determined measurement category (S140), and determining the communication resource management algorithm based at least on the determined measurement category (S150).

Embodiment 3

The method of embodiment 1, further including, when the container repository does not include the measurement category for the network device, determining the measurement category for the network device by offline assessment of a network device measurement algorithm.

Embodiment 4

The method of embodiment 1, further including, when the container repository does not include the measurement category for the network device (S115), determining the measurement category for the network device by probing the network device to determine a network device measurement algorithm (S160).

Embodiment 5

The method of embodiment 4, wherein the probing is a passive probing that does not require modification of operating conditions of a network supporting the network device for the probing (S180).

Embodiment 6

The method of embodiment 4, wherein the probing is an active probing that requires modification of operating conditions of a network supporting the network device (S190).

Embodiment 7

The method of embodiment 6, wherein the modification includes modification of a communication resource manager to probe for filtering of a channel quality indicator in the network device (S200).

Embodiment 8

The method of any of embodiments 1 through 7, wherein the container repository is a database.

Embodiment 9

The method of embodiment 8, wherein the database is in a Mobility Management Entity.

Embodiment 10

The method of any of embodiments 1 through 9, wherein when the container repository does not include the measurement category for the network device (S115), a default communication resource management algorithm is used to support the network device (S210) until the container repository is updated to include the determined measurement category for the network device (S220).

Embodiment 11

The method of any of embodiments 1 through 10, wherein the communication resource management algorithm is determined from a plurality of communication resource management algorithms stored in a base station and wherein the network device is a wireless device.

Embodiment 12

The method of any of embodiments 1 through 10, wherein the communication resource management algorithm is determined from a plurality of communication resource management algorithms stored in a wireless device and wherein the network device is a base station.

Embodiment 13

The method of embodiment 1, comprising the step of identifying the network device.

Embodiment 14

The method of embodiment 2, wherein obtaining the measurement characteristic from the network device is performed by a first node, and determining the communication resource management algorithm based at least on the determined measurement category is performed by a second node.

Embodiment 15

A method including obtaining a measurement characteristic of a measurement algorithm used by a network device within a network to obtain measurement information (S240), and categorizing the measurement algorithm used by the network device into a measurement category based on the measurement characteristic (S250).

Embodiment 16

The method of embodiment 15, further including performing a network function based on the measurement category (S260).

Embodiment 17

The method of embodiment 15, wherein the network is a data communication network and obtaining the measurement characteristic used by the network device includes probing the network device to determine the measurement characteristic.

Embodiment 18

A node (12) for determining a communication resource management algorithm, the node comprising circuitry containing instructions which, when executed, cause the node to obtain a measurement characteristic from a network device (14) and search a container repository (16) to determine an existence of a measurement category for the measurement characteristic obtained from the network device (14). When the container repository (16) includes the measurement category for the network device (14), the communication resource management algorithm is determined based at least on the measurement category.

Embodiment 19

The node (12) of embodiment 18, wherein the instructions are further configured to, when the container repository (16) does not include the measurement category for the network device (14), update the container repository (16) to include the network device (14) in a determined measurement category and determine the communication resource management algorithm based at least on the determined measurement category.

Embodiment 20

The node (12) of embodiment 18, wherein the instructions are further configured to, when the container repository (16) does not include the measurement category for the identified type of the network device (14), determine the measurement category for the network device (14) by offline assessment of a network device measurement algorithm.

Embodiment 21

The node (12) of embodiment 18, wherein the instructions are the further configured to, when the container repository (16) does not include the measurement category for the identified type of the network device (14), determine the measurement category for the network device (14) by probing the network device (14) to determine a network device measurement algorithm, the measurement category being based on the determined network device measurement algorithm.

Embodiment 22

The node (12) of embodiment 21, wherein the probing is a passive probing that does not require modification of operating conditions of a network supporting the type of network device (14) for the probing.

Embodiment 23

The node (12) of embodiment 21, wherein the probing is an active probing that requires modification of operating conditions of a network supporting the identified type of the network device (14).

Embodiment 24

The node (12) of embodiment 23, wherein the modification includes modification of a communication resource manager (20) to probe for filtering of a channel quality indicator in the identified type of the network device (14).

Embodiment 25

The node (12) of embodiment 18, wherein the container repository (16) is a database (15).

Embodiment 26

The node (12) of embodiment 25, wherein the database is in a Mobility Management Entity.

Embodiment 27

The node (12) of embodiment 18, wherein when the container repository (16) does not include the measurement category for the network device (14), a default communication resource management algorithm is used to support the network device (14) until the container repository (16) is updated to include the determined measurement category for the network device (14).

Embodiment 28

The node (12) of embodiment 18, wherein the network device (14) is a wireless device, wherein the node (12) is a base station having circuitry including a plurality of communication resource management algorithms and instructions that, when executed, further configure the node (12) to determine the communication resource management algorithm from the plurality of communication resource management algorithms.

Embodiment 29

The node (12) of embodiment 18, wherein the network device (14) is a base station, wherein the node (12) is a wireless device having circuitry including a plurality of communication resource management algorithms and instructions that, when executed, further configure the node (12) to determine the communication resource management algorithm from the plurality of communication resource management algorithms.

Embodiment 30

The node (12) of embodiment 18, wherein the instructions are further configured to identify the network device (14).

Embodiment 31

A node (12) including circuitry containing instructions which when executed cause the node to obtain a measurement characteristic of a measurement algorithm used by a network device within a network to obtain measurement information, and categorize the measurement algorithm used by the network device (14) into a measurement category based on the measurement characteristic.

Embodiment 32

The node (12) of embodiment 31, wherein the instructions are further configured to: perform a network function based on the measurement category of the measurement characteristic, the measurement category based at least on the measurement algorithm used to obtain the measurement characteristic.

Embodiment 33

The node (12) of embodiment 31, wherein the network is a data communication network and obtaining the measurement characteristic used by the network device (14) includes probing the network device (14).

Embodiment 34

A node (12) for determining a communication resource management algorithm, in which the node includes a communication interface module (52) configured to obtain a measurement characteristic from a network device (14) and an algorithm determining module (54) configured to search a container repository (16) to determine an existence of a measurement category for the measurement characteristic obtained from the network device (14) and, when the container repository (16) includes the measurement category for the network device (14), determine the communication resource management algorithm based at least on the measurement category.

Embodiment 35

The node of any of embodiments 18-33, wherein the circuitry comprises at least one processor and a memory coupled to the processor in which the memory contains the instructions.

Embodiment 36

A computer program comprising instructions which, when executed on at least one processor, cause the at least one processor to carry out the method according to any one of embodiments 1-17.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows. Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments may be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method for determining a communication resource management algorithm, the method comprising:
   obtaining a measurement characteristic from a network device, the measurement characteristic including measurement algorithm characteristics of measurement algorithms used to obtain measurements at the network device;
   searching a container repository to determine an existence of a measurement category for the measurement algorithm characteristics obtained from the network device, the container repository being a database;
   when the container repository includes the measurement category for the network device, determining the communication resource management algorithm based at least on the measurement category;
   when the container repository does not include the measurement category for the network device, determining the measurement category for the network device by offline assessment of a network device measurement algorithm; and
   providing differentiated handling of at least one communication associated with the network device based on the determined communication resource management algorithm.

2. The method of claim 1, further comprising, when the container repository does not include the measurement category for the network device, updating the container repository to include the network device in a determined measurement category, and determining the communication resource management algorithm based at least on the determined measurement category.

3. The method of claim 1, further comprising, when the container repository does not include the measurement category for the network device, determining the measurement category for the network device by probing the network device to determine a network device measurement algorithm.

4. The method of claim 3, wherein the probing is a passive probing.

5. The method of claim 3, wherein the probing is an active probing.

6. The method of claim 5, wherein the active probing includes modification of a communication resource manager to probe for filtering of a channel quality indicator in the network device.

7. The method of claim 1, wherein the container repository is in a Mobility Management Entity.

8. The method of claim 1, wherein when the container repository does not include the measurement category for the network device, a default communication resource management algorithm is used to support the network device until the container repository is updated to include the determined measurement category for the network device.

9. The method of claim 1, wherein the communication resource management algorithm is determined from a plurality of communication resource management algorithms stored in a base station and wherein the network device is a wireless device.

10. The method of claim 1, wherein the communication resource management algorithm is determined from a plurality of communication resource management algorithms stored in a wireless device and wherein the network device is a base station.

11. The method of claim 1, further comprising identifying the network device.

12. The method of claim 2, wherein obtaining the measurement characteristic from the network device is performed by a first node, and determining the communication resource management algorithm based at least on the determined measurement category is performed by a second node.

13. A node for determining a communication resource management algorithm, the node comprising circuitry containing instructions which, when executed, cause the node to:
   obtain a measurement characteristic from a network device, the measurement characteristic including measurement algorithm characteristics of measurement algorithms used to obtain measurements at the network device;
   search a container repository to determine an existence of a measurement category for the measurement algorithm characteristics obtained from the network device, the container repository being a database;
   when the container repository includes the measurement category for the network device, determine the communication resource management algorithm based at least on the measurement category;
   when the container repository does not include the measurement category for the identified type of the network device, determine the measurement category for the network device by offline assessment of a network device measurement algorithm; and
   provide differentiated handling of at least one communication associated with the network device based on the determined communication resource management algorithm.

14. The node of claim 13, wherein the instructions are further configured to, when the container repository does not include the measurement category for the network device, update the container repository to include the network device in a determined measurement category and determine the communication resource management algorithm based at least on the determined measurement category.

15. The node of claim 13, wherein the instruction are further configured to, when the container repository does not include the measurement category for the identified type of the network device, determine the measurement category for the network device by probing the network device to determine a network device measurement algorithm, the measurement category being based on the determined network device measurement algorithm.

16. The node of claim 15, wherein the probing is a passive probing.

17. The node of claim 15, wherein the probing is an active probing.

18. The node of claim 17, wherein the active probing includes modification of a communication resource manager to probe for filtering of a channel quality indicator in the identified type of the network device.

19. The node of claim 13, wherein the database is in a Mobility Management Entity.

20. The node of claim 13, wherein when the container repository does not include the measurement category for the network device, a default communication resource management algorithm is used to support the network device until the container repository is updated to include the determined measurement category for the network device.

21. The node of claim 13, wherein the network device is a wireless device, wherein the node is a base station having circuitry comprising:
   a plurality of communication resource management algorithms; and
   instructions that, when executed, further configure the node to determine the communication resource management algorithm from the plurality of communication resource management algorithms.

22. The node of claim 13, wherein the network device is a base station, wherein the node is a wireless device having circuitry comprising a plurality of communication resource management algorithms; and
   instructions that, when executed, further configure the node to determine the communication resource management algorithm from the plurality of communication resource management algorithms.

23. The node of claim 13, wherein the instructions are further configured to identify the network device.

24. A node for determining a communication resource management algorithm, the node comprising:
   a communication interface module configured to obtain a measurement characteristic from a network device, the measurement characteristic including measurement algorithm characteristics of measurement algorithms used to obtain measurements at the network device; and
   an algorithm determining module configured to:
      search a container repository to determine an existence of a measurement category for the measurement algorithm characteristics obtained from the network device, the container repository being a database;
      when the container repository includes the measurement category for the network device, determine the communication resource management algorithm based at least on the measurement category; and
      when the container repository does not include the measurement category for the network device, determining the measurement category for the network device by offline assessment of a network device measurement algorithm; and
   the communication interface module being further configured to provide differentiated handling of at least one communication associated with the network device based on the determined communication resource management algorithm.

25. The node of claim 13, wherein the circuitry comprises at least one processor and a memory coupled to the processor, the memory containing the instructions.

26. A non-transitory computer program comprising instructions which, when executed on at least one processor, cause the at least one processor to carry out a method, the method comprising:
   obtaining a measurement characteristic from a network device, the measurement characteristic including measurement algorithm characteristics of measurement algorithms used to obtain measurements at the network device;
   searching a container repository to determine an existence of a measurement category for the measurement algorithm characteristics obtained from the network device, the container repository being a database;

when the container repository includes the measurement category for the network device, determining the communication resource management algorithm based at least on the measurement category;

when the container repository does not include the measurement category for the network device, determining the measurement category for the network device by offline assessment of a network device measurement algorithm; and providing differentiated handling of at least one communication associated with the network device based on the determined communication resource management algorithm.

* * * * *